United States Patent
Scalisi et al.

(10) Patent No.: US 8,497,774 B2
(45) Date of Patent: Jul. 30, 2013

(54) APPARATUS AND METHOD FOR ADJUSTING REFRESH RATE OF LOCATION COORDINATES OF A TRACKING DEVICE

(75) Inventors: Joseph F. Scalisi, Yorba Linda, CA (US); Roger B. Anderson, Arcadia, CA (US)

(73) Assignee: Location Based Technologies Inc., Irvine, CA (US)

( * ) Notice: Subject to any disclaimer, the term of this patent is extended or adjusted under 35 U.S.C. 154(b) by 992 days.

(21) Appl. No.: 12/419,451

(22) Filed: Apr. 7, 2009

(65) Prior Publication Data

US 2009/0189807 A1     Jul. 30, 2009

Related U.S. Application Data

(63) Continuation-in-part of application No. 11/969,905, filed on Jan. 6, 2008, now Pat. No. 8,102,256, and a continuation-in-part of application No. 11/753,979, filed on May 25, 2007, and a continuation-in-part of application No. 11/933,024, filed on Oct. 31, 2007, and a continuation-in-part of application No. 11/784,400, filed on Apr. 5, 2007, now abandoned, and a continuation-in-part of application No. 11/935,901, filed on Nov. 6, 2007, now Pat. No. 8,244,468, and a continuation-in-part of application No. 11/784,318, filed on Apr. 5, 2007, now abandoned.

(51) Int. Cl.
*G08B 1/08* (2006.01)

(52) U.S. Cl.
USPC .................................................... 340/539.13

(58) Field of Classification Search
USPC ............... 340/539.13, 539.21, 686.1, 636.1, 340/636.2, 636.19; 320/108
See application file for complete search history.

(56) References Cited

U.S. PATENT DOCUMENTS 3,924,102 A    12/1975   Hanekom
4,218,582 A     8/1980   Hellman et al.
(Continued)

FOREIGN PATENT DOCUMENTS

JP         10325735      12/1998
JP         11064480       3/1999
(Continued)

OTHER PUBLICATIONS

Huff, Greg H., et al., "Directional Reconfigurable Antennas on Laptop Computers: Simulation, Measurement and Evaluation of Candidate Integration Positions", *IEEE Transactions on Antenaas*, vol. 52, No. 12, (Dec. 2004), pp. 3220-3227.

(Continued)

*Primary Examiner* — Phung Nguyen
(74) *Attorney, Agent, or Firm* — Timberline Patent Law Group PLLC; Mark Farrell

(57) ABSTRACT

A local charging management device manages electrical resource capability for an electronic tracking device. In one embodiment, the electronic tracking device includes a battery power monitor, a charging unit; and an electrical power resource management component. The electrical power resource management component adjusts cycle timing of one or more of control parameters for the tracking device. Control parameters include request rate of location coordinate packets to a target host and a listen rate of the location coordinate packets. The adjustment is responsive to an estimated charge level of the charging unit, velocity of the device, and user desired inputs.

19 Claims, 7 Drawing Sheets

U.S. PATENT DOCUMENTS

| | | | |
|---|---|---|---|
| 4,379,334 A | 4/1983 | Feagins, Jr. et al. | |
| 4,807,453 A | 2/1989 | Bernier et al. | |
| 4,850,007 A | 7/1989 | Marino et al. | |
| 4,885,920 A | 12/1989 | Larson | |
| 5,079,541 A | 1/1992 | Moody | |
| 5,127,042 A | 6/1992 | Gillig et al. | |
| 5,353,331 A | 10/1994 | Emery et al. | |
| 5,361,612 A | 11/1994 | Voiculescu et al. | |
| 5,386,468 A | 1/1995 | Akiyama et al. | |
| 5,417,092 A | 5/1995 | Iu | |
| 5,432,542 A | 7/1995 | Thibadeau et al. | |
| 5,490,402 A | 2/1996 | Shieh | |
| 5,541,976 A | 7/1996 | Ghisler | |
| 5,555,286 A | 9/1996 | Tendler | |
| 5,563,579 A | 10/1996 | Carter | |
| 5,565,909 A | 10/1996 | Thibadeau et al. | |
| 5,768,920 A | 6/1998 | DeBevoise | |
| 5,785,181 A | 7/1998 | Quartararo, Jr. | |
| 5,876,765 A | 3/1999 | Hinterlechner et al. | |
| 5,967,841 A | 10/1999 | Bianca et al. | |
| 5,973,599 A | 10/1999 | Nicholson et al. | |
| 6,078,575 A | 6/2000 | Dommety et al. | |
| 6,088,453 A | 7/2000 | Shimbo | |
| 6,141,356 A | 10/2000 | Gorman | |
| 6,236,365 B1 | 5/2001 | LeBlanc et al. | |
| 6,243,039 B1 | 6/2001 | Elliot | |
| 6,278,370 B1 | 8/2001 | Underwood | |
| 6,300,875 B1 | 10/2001 | Schafer | |
| 6,327,533 B1 | 12/2001 | Chou | |
| 6,330,817 B1 | 12/2001 | Frolov | |
| 6,388,612 B1 | 5/2002 | Neher | |
| 6,396,403 B1 | 5/2002 | Haner | |
| 6,414,629 B1 | 7/2002 | Curcio | |
| 6,441,741 B1 | 8/2002 | Yoakum | |
| 6,445,921 B1 | 9/2002 | Bell | |
| 6,453,037 B1 | 9/2002 | Welter, Jr. | |
| 6,498,797 B1 | 12/2002 | Anerousis et al. | |
| 6,546,253 B1 | 4/2003 | Chow et al. | |
| 6,611,755 B1 | 8/2003 | Coffee et al. | |
| 6,633,835 B1 | 10/2003 | Moran et al. | |
| 6,654,883 B1 | 11/2003 | Tatebayashi | |
| 6,674,368 B2 | 1/2004 | Hawkins et al. | |
| 6,708,028 B1 | 3/2004 | Byrne | |
| 6,716,101 B1 | 4/2004 | Meadows | |
| 6,731,212 B2 | 5/2004 | Hirose et al. | |
| 6,732,090 B2 | 5/2004 | Shanahan et al. | |
| 6,735,630 B1 | 5/2004 | Gelvin et al. | |
| 6,747,561 B1 | 6/2004 | Reeves et al. | |
| 6,754,470 B2 | 6/2004 | Hendrickson et al. | |
| 6,768,942 B1 | 7/2004 | Chojnacki | |
| 6,774,797 B2 | 8/2004 | Freathy et al. | |
| 6,778,089 B2 | 8/2004 | Yoakum | |
| 6,812,824 B1 | 11/2004 | Goldinger et al. | |
| 6,819,247 B2 | 11/2004 | Birnbach et al. | |
| 6,833,787 B1 | 12/2004 | Levi | |
| 6,850,252 B1 | 2/2005 | Hoffberg | |
| 6,859,533 B1 | 2/2005 | Wang et al. | |
| 6,879,244 B1 | 4/2005 | Scalisi | |
| 6,882,897 B1 | 4/2005 | Fernandez | |
| 6,928,280 B1 | 8/2005 | Xanthos et al. | |
| 6,937,726 B1 | 8/2005 | Wang | |
| 6,952,181 B2 | 10/2005 | Karr et al. | |
| 6,975,941 B1 * | 12/2005 | Lau et al. | 701/491 |
| 6,978,021 B1 | 12/2005 | Chojnacki | |
| 6,988,026 B2 | 1/2006 | Breed et al. | |
| 6,992,584 B2 | 1/2006 | Dooley et al. | |
| 6,998,985 B2 | 2/2006 | Reisman et al. | |
| 6,998,995 B2 | 2/2006 | Nakajima | |
| 7,019,644 B2 | 3/2006 | Barrie | |
| 7,020,701 B1 | 3/2006 | Gelvin et al. | |
| 7,038,590 B2 | 5/2006 | Hoffman et al. | |
| 7,049,957 B2 | 5/2006 | Watson | |
| 7,064,711 B2 | 6/2006 | Strickland et al. | |
| 7,065,244 B2 | 6/2006 | Akimov | |
| 7,065,348 B1 | 6/2006 | Aoki et al. | |
| 7,065,370 B2 | 6/2006 | Ogaki et al. | |
| 7,079,650 B1 | 7/2006 | Knudsen | |
| 7,088,242 B2 | 8/2006 | Aupperle et al. | |
| 7,088,252 B2 | 8/2006 | Weekes | |
| 7,099,921 B1 | 8/2006 | Engstrom et al. | |
| 7,109,868 B2 | 9/2006 | Yoakum | |
| 7,119,669 B2 | 10/2006 | Lundsgaard et al. | |
| 7,120,928 B2 | 10/2006 | Sheth et al. | |
| 7,123,189 B2 * | 10/2006 | Lalik et al. | 342/357.31 |
| 7,139,396 B2 | 11/2006 | Montgomery et al. | |
| 7,146,367 B2 | 12/2006 | Shutt | |
| 7,149,189 B2 | 12/2006 | Huntington et al. | |
| 7,155,238 B2 | 12/2006 | Katz | |
| 7,158,912 B2 | 1/2007 | Vock et al. | |
| 7,181,192 B2 | 2/2007 | Panasik et al. | |
| 7,200,673 B1 | 4/2007 | Augart | |
| 7,218,242 B2 | 5/2007 | Scalisi et al. | |
| 7,246,007 B2 | 7/2007 | Ferman et al. | |
| 7,257,836 B1 | 8/2007 | Moore | |
| 7,268,700 B1 | 9/2007 | Hoffberg | |
| 7,272,212 B2 | 9/2007 | Eberle et al. | |
| 7,272,662 B2 | 9/2007 | Chesnais et al. | |
| 7,284,191 B2 | 10/2007 | Grefenstette et al. | |
| 7,299,277 B1 | 11/2007 | Moran et al. | |
| 7,302,634 B2 | 11/2007 | Lucovsky et al. | |
| 7,313,825 B2 | 12/2007 | Redlich et al. | |
| 7,501,952 B2 | 3/2009 | Forster | |
| 7,501,984 B2 | 3/2009 | Forster et al. | |
| 7,571,628 B2 | 8/2009 | D'Anieri | |
| 7,598,855 B2 | 10/2009 | Scalisi | |
| 7,612,663 B2 | 11/2009 | Sun | |
| 7,626,499 B2 | 12/2009 | Burneske et al. | |
| 7,728,724 B1 | 6/2010 | Scalisi et al. | |
| 7,742,774 B2 | 6/2010 | Oh et al. | |
| 7,823,073 B2 | 10/2010 | Holmes et al. | |
| 7,823,424 B2 | 11/2010 | Shabtay et al. | |
| 7,826,968 B2 * | 11/2010 | Huang et al. | 701/469 |
| 7,831,264 B2 | 11/2010 | Miegel | |
| 7,926,314 B2 | 4/2011 | Tollefson | |
| 7,995,994 B2 | 8/2011 | Khetawat et al. | |
| 8,010,601 B2 | 8/2011 | Jennings et al. | |
| 2001/0030667 A1 | 10/2001 | Kelts | |
| 2001/0048364 A1 | 12/2001 | Kalthoff et al. | |
| 2002/0041328 A1 | 4/2002 | LeCompte et al. | |
| 2002/0067256 A1 | 6/2002 | Kail, IV | |
| 2002/0077130 A1 | 6/2002 | Owensby | |
| 2002/0180602 A1 | 12/2002 | Yoakum | |
| 2002/0186135 A1 | 12/2002 | Wagner | |
| 2002/0196123 A1 | 12/2002 | Diehl et al. | |
| 2003/0004776 A1 | 1/2003 | Perrella et al. | |
| 2003/0043200 A1 | 3/2003 | Faieta et al. | |
| 2003/0131073 A1 | 7/2003 | Lucovsky et al. | |
| 2003/0177094 A1 | 9/2003 | Needham et al. | |
| 2003/0208518 A1 | 11/2003 | Gura et al. | |
| 2003/0210262 A1 | 11/2003 | Gahm et al. | |
| 2003/0212729 A1 | 11/2003 | Eberle et al. | |
| 2003/0235307 A1 | 12/2003 | Miyamoto | |
| 2004/0010689 A1 | 1/2004 | Vanstone et al. | |
| 2004/0165726 A1 | 8/2004 | Yamamichi et al. | |
| 2004/0166879 A1 | 8/2004 | Meadows et al. | |
| 2004/0172403 A1 | 9/2004 | Steele et al. | |
| 2004/0212493 A1 | 10/2004 | Stilp | |
| 2005/0012620 A1 | 1/2005 | Yoakum | |
| 2005/0044356 A1 | 2/2005 | Srivastava et al. | |
| 2005/0071736 A1 | 3/2005 | Schneider et al. | |
| 2005/0099303 A1 | 5/2005 | Suckerman | |
| 2005/0159883 A1 | 7/2005 | Humphries et al. | |
| 2005/0181870 A1 | 8/2005 | Nguyen et al. | |
| 2005/0188403 A1 | 8/2005 | Kotzin | |
| 2005/0210260 A1 | 9/2005 | Venkatesan et al. | |
| 2005/0246647 A1 | 11/2005 | Beam et al. | |
| 2005/0248459 A1 | 11/2005 | Bonalle et al. | |
| 2006/0009152 A1 | 1/2006 | Millard et al. | |
| 2006/0176149 A1 | 8/2006 | Douglas | |
| 2006/0205416 A1 | 9/2006 | Kayzar et al. | |
| 2006/0206246 A1 | 9/2006 | Walker | |
| 2006/0211405 A1 | 9/2006 | Scalisi et al. | |
| 2006/0223518 A1 | 10/2006 | Haney | |
| 2006/0232429 A1 | 10/2006 | Gonzalez | |
| 2006/0253590 A1 | 11/2006 | Nagy et al. | |
| 2006/0290497 A1 | 12/2006 | Sugata | |
| 2007/0028088 A1 | 2/2007 | Bayrak et al. | |

| | | | |
|---|---|---|---|
| 2007/0033531 | A1 | 2/2007 | Marsh |
| 2007/0053513 | A1 | 3/2007 | Hoffberg |
| 2007/0054530 | A1 | 3/2007 | Bauer et al. |
| 2007/0061303 | A1 | 3/2007 | Ramer et al. |
| 2007/0073719 | A1 | 3/2007 | Ramer et al. |
| 2007/0083819 | A1 | 4/2007 | Shoemaker |
| 2007/0159322 | A1 | 7/2007 | Campbell |
| 2007/0200695 | A1 | 8/2007 | Almstrand et al. |
| 2007/0229350 | A1 | 10/2007 | Scalisi et al. |
| 2007/0240212 | A1 | 10/2007 | Matalytski |
| 2007/0255620 | A1 | 11/2007 | Tumminaro et al. |
| 2007/0287473 | A1 | 12/2007 | Dupray |
| 2007/0288427 | A1 | 12/2007 | Ramer et al. |
| 2008/0010585 | A1 | 1/2008 | Schneider |
| 2008/0021741 | A1 | 1/2008 | Holla et al. |
| 2008/0028063 | A1 | 1/2008 | Holmes et al. |
| 2008/0059504 | A1 | 3/2008 | Barbetta et al. |
| 2008/0059889 | A1 | 3/2008 | Parker et al. |
| 2008/0088437 | A1 | 4/2008 | Aninye et al. |
| 2008/0090550 | A1 | 4/2008 | Scalisi et al. |
| 2008/0108370 | A1 | 5/2008 | Aninye |
| 2008/0109762 | A1 | 5/2008 | Hundal et al. |
| 2008/0129491 | A1 | 6/2008 | Ruperto et al. |
| 2008/0171559 | A1 | 7/2008 | Frank et al. |
| 2008/0172173 | A1 | 7/2008 | Chang et al. |
| 2008/0228654 | A1 | 9/2008 | Edge |
| 2008/0252254 | A1 | 10/2008 | Osada |
| 2008/0252459 | A1 | 10/2008 | Butler et al. |
| 2009/0098857 | A1 | 4/2009 | De Atley |
| 2009/0098903 | A1 | 4/2009 | Donaldson et al. |
| 2009/0103722 | A1 | 4/2009 | Anderson et al. |
| 2009/0111393 | A1 | 4/2009 | Scalisi et al. |
| 2009/0117921 | A1 | 5/2009 | Beydler et al. |
| 2009/0119119 | A1 | 5/2009 | Scalisi et al. |
| 2009/0174603 | A1 | 7/2009 | Scalisi et al. |
| 2009/0177385 | A1 | 7/2009 | Matas et al. |
| 2009/0201127 | A1 | 8/2009 | Stobbe et al. |
| 2009/0315706 | A1 | 12/2009 | Scalisi et al. |
| 2009/0315767 | A1 | 12/2009 | Scalisi et al. |
| 2010/0216487 | A1 | 8/2010 | Yamaguchi |

FOREIGN PATENT DOCUMENTS

| | | |
|---|---|---|
| JP | 13074494 | 3/2001 |
| KR | 1020020001257 | 1/2002 |
| KR | 1020050063802 | 6/2005 |
| KR | 1005322589 | 11/2005 |
| WO | WO-2007107022 | 9/2007 |

OTHER PUBLICATIONS

Fredrick, Jonathan D., et al., "Smart Antennas Based on Spatial Multiplexing of Local Elements (SMILE) for Mutual Coupling Reduction", *IEEE Transactions on Antennas and Propagation*, vol. 52, No. 1, (Jan. 2004),pp. 106-114.

Hansen, Michael "Overmolding: A Multifaceted Medical Device Technology", *Medical Device & Diagnostic Industry*, (Jan. 2006),5 pages.

"Material Property Data for Various Thermoplastic Elastomers", *MATLAB*, (May 29, 2007),7 pages.

Mannion, Patrick "Antenna Diversity Doubles CDMA Net Capacity", *EE Times*, (May 12, 2003),3 pages.

Burk, Steve "Overmolding of Embedded Electronics", *Connector Specifier*, Retrieved from the Internet at http:/cs.pennet.com on May 20, 2007,(Apr. 2001),4 pages.

Schuster, Mike et al., "Increasing the Frequency Response of the ADXL Series Accelerometers", *Analog Devices Application Note AN-377*, (Feb. 2006),1 page.

"Small and Thin +_5g Accelerometer", *Analog Devices—ADXL320*, (2004),16 pages.

Matsakis, Demetrios "The Timing Group Delay (TGD) Correction and GPS Timing Basis", *Proceedings of the 63rd Annual Meeting of The Institute of Navigation*, Cambridge, MA, (Apr. 2007),6 pages.

"GPS Compass Solutions—Application vs. Accuracy", *CEACT Information Systems*, (Apr. 13, 2006),10 pages.

"ET301 GPS-UAV Development Platform", (Jul. 12, 2006),11 pages.

Lemaire, Christophe "Surface Micromachined Sensors for Vehicle Navigation Systems", *Analog Devices, Inc.*, Retrieved from the Internet from http://www.analog.com/en/content/0,2886,764%255F800%255F8077%255F0,00. html on Dec. 25, 2007.,(Dec. 2007),4 pages.

Li, Xiaojing et al., "The Complementary Characteristics of GPS and Accelerometer in Monitoring Structural Deformation", *ION 2005 Meeting*, (2005),9 pages.

Li, Xiaojing et al., "Full-Scale Structural Monitoring Using an Integrated GPS and Accelerometer System", University of New South Wales, (Feb. 14, 2006),15 pages.

* cited by examiner

APPARATUS AND METHOD FOR ADJUSTING REFRESH RATE OF LOCATION COORDINATES OF A TRACKING DEVICE

PRIORITY AND RELATED APPLICATIONS

This application is a continuation-in-part of and claims priority to U.S. Pat. No. 8,102,256, originally filed as U.S. patent application Ser. No. 11/969,905 entitled "Apparatus and Method for Determining Location and Tracking Coordinates of a Tracking Device" that was filed on Jan. 6, 2008; and incorporates by reference in their entirety and claims priority to: U.S. patent application Ser. No. 11/753,979 filed on May 25, 2007, entitled "Apparatus and Method for Providing Location Information on Individuals and Objects Using Tracking Devices"; U.S. patent application Ser. No. 11/933,024 filed on Oct. 31, 2007, entitled "Apparatus and Method for Manufacturing an Electronic Package"; U.S. patent application Ser. No. 11/784,400 filed on Apr. 5, 2007, entitled "Communication System and Method Including Dual Mode Capability"; U.S. patent application Ser. No. 11/784,318 filed on Apr. 5, 2007, entitled "Communication System and Method Including Communication Billing Options"; and U.S. Pat. No. 8,244,468, originally filed as U.S. patent application Ser. No. 11/935,901 filed on Nov. 6, 2007, entitled "System and Method for Creating and Managing a Personalized Web Interface for Monitoring Location Information on Individuals and Objects Using Tracking Devices."

BACKGROUND OF THE INVENTION

1. Field of the Invention

The invention relates generally to the field of location and tracking communication systems. More particularly, the present invention relates in one embodiment to a power conservation methodology and apparatus incorporated as part of portable electronic tracking device for individuals and objects to improve battery life by a wireless location and tracking system and/or wireless communication system (WCS).

2. Description of Related Technology

Accelerometers are conventionally integrated into electronics systems that are part of a vehicle, vessel, and airplane to detect, measure, and monitor deflections, vibrations, and acceleration. Accelerometers, for example, may include one or more Micro Electro-Mechanical System (MEMS) devices. In particular, MEMS devices include one or more suspended cantilever beams (e.g., single-axis, dual-axis, and three-axis models), as well as deflection sensing circuitry. Accelerometers are utilized by a multitude of electronics manufacturers.

For instance, electronics gaming manufacturers exploit an accelerometer's deflection sensing capability, for instance, to measure device tilt and control game functionality. In another instance, consumer electronics manufacturers, e.g., Apple, Ericsson, and Nike, incorporate accelerometers in personal electronic devices, e.g., Apple iPhone to provide a changeable screen display orientation that toggles between portrait and landscape layout window settings; to manage human inputs through a human interface, e.g., Apple iPod® touch screen interface; and to measure game movement and tilt, e.g., Wii gaming remotes. Still others including automobile electronics circuitry manufacturers utilize MEMS accelerometers to initiate airbag deployment in accordance with a detected collision severity level by measuring negative vehicle acceleration.

Other electronics manufacturer products, e.g., Nokia 5500 sport, count step motions using a 3D accelerometer, and translate user information via user's taps or shaking motion to select song titles and to enable mp3 player track switching. In another instance, portable or laptop computers include hard-disk drives integrated with an accelerometer to detect displacement or falling incidents. For instance, when a hard-disk accelerometer detects a low-g condition, e.g., indicating free-fall and expected shock, a hard-disk write feature may be temporarily disabled to avoid accidental data overwriting and prevent stored data corruption. After free-fall and expected shock, the hard-disk write feature is enabled to allow data to be written to one or more hard-disk tracks. Still others including medical product manufacturers utilize accelerometers to measure depth of Cardio Pulmonary Resuscitation (CPR) chest compressions. Sportswear manufacturers, e.g., Nike sports watches and footwear, incorporate accelerometers to feedback speed and distance to a runner via a connected iPod® Nano.

Still others including manufacturers of conventional inertial navigation systems deploy one or more accelerometers as part of, for instance, on-board electronics of a vehicle, vessel, train and/or airplane. In addition to accelerometer measurements, conventional inertial navigation systems integrate one or more gyroscopes with the on-board electronics to assist tracking including performing various measurements, e.g., tilt, angle, and roll. More specifically, gyroscopes measure angular velocity, for instance, of a vehicle, vessel, train, and/ or airplane in an inertial reference frame. The inertial reference frame, provided, for instance, by a human operator, a GPS receiver, or position and velocity measurements from one or more motion sensors.

More specifically, integration of measured inertial accelerations commences with, for instance, original velocity, for instance, of a vehicle, vessel, train, and/or airplane to yield updated inertial system velocities. Another integration of updated inertial system velocities yields an updated inertial system orientation, e.g., tilt, angle, and roll, within a system limited positioning accuracy. In one instance to improve positioning accuracy, conventional inertial navigation systems utilize GPS system outputs. In another instance to improve positioning accuracy, conventional inertial navigation systems intermittently reset to zero inertial tracking velocity, for instance, by stopping the inertial navigation system. In yet other examples, control theory and Kalman filtering provide a framework to combine motion sensor information in attempts to improve positional accuracy of the updated inertial system orientation.

Potential drawbacks of many conventional inertial navigation systems include electrical and mechanical hardware occupying a large real estate footprint and requiring complex electronic measurement and control circuitry with limited applicably to changed environmental conditions. Furthermore, many conventional inertial navigation system calculations are prone to accumulated acceleration and velocity measurement errors. For instance, many conventional inertial navigation acceleration and velocity measurement errors are on the order of 0.6 nautical miles per hour in position and tenths of a degree per hour in orientation.

In contrast to conventional inertial navigation systems, a conventional Global Positioning Satellite (GPS) system uses Global Positioning Signals (GPS) to monitor and track location coordinates communicated between location coordinates monitoring satellites and an individual or an object having a GPS transceiver. In this system, GPS monitoring of location coordinates is practical when a GPS transceiver receives at least a minimal GPS signal level. However, a minimal GPS signal level may not be detectable when an individual or object is not located in a skyward position. For instance, when an individual or object carrying a GPS transceiver enters a covered structure, e.g., a garage, a parking structure, or a large building, GPS satellite communication signals may be obstructed or partially blocked, hindering tracking and monitoring capability. Not only is a GPS transceiver receiving a weak GPS signal, but also the GPS transceiver is depleting battery power in failed attempts to acquire communication signals from one or more location coordinates monitoring satellites, e.g., GPS satellites, or out-of-range location coordinates reference towers. Furthermore, weak GPS communication signals may introduce errors in location coordinates information.

In addition during the acquisition of signaling and or other information, a conventional GPS transceiver has limited functionality or capabilities associated with control and monitoring of battery power usage. For instance, a conventional GPS transceiver may have some indication battery charge level such as a power level bar but have very few or any ability or capability to control or reduce power usage. Furthermore, often users do not realize or are only alerted when their GPS transceiver is using reserve power or about to suddenly involuntarily shut-down to prevent data loss and loss of other user information such as personal GPS settings, screen color displays, and user recreational or pleasure settings.

More specifically, users of conventional GPS transceivers typically are unprepared for such a sudden loss of GPS transceiver service. Generally, within minutes of an initial warning indication, e.g., beeping, vibration, voice, alarms or combination thereof, the GPS transceiver shuts off. As such, a user may suddenly experience loss of location determination or location based capabilities or monitoring or being monitored capabilities and not prepared for such sudden outage. Furthermore, even if a user could reduce battery power usage, a result, within the last few minutes of battery power, a user has little or no incentive or capability to alter battery usage of a conventional GPS transceiver due to low power level GPS transceivers may suddenly become non-operational without any warning to or recourse to a user. Thus, when a conventional GPS transceiver is low in power level, a user's most viable alternative would be locating an electrical outlet to recharge their conventional GPS transceiver.

In summary, electronic tracking device and methodology that provides additional advantages over conventional systems such as improved power management, e.g., efficient use of battery power and provide other improvements include supplementing conventional electronic tracking device monitoring, e.g., increased measurement accuracy of location coordinates of objects and individuals traveling into and/or through a structure, e.g., a partially covered building, a parking structure, or a substantially enclosed structure, such as a basement or a storage area in a high-rise office building.

SUMMARY OF THE INVENTION

In a first aspect of the present invention, a portable electronic apparatus for a tracking device is disclosed. In one embodiment, the tracking device includes a battery having a battery charge level, transceiver circuitry, processor circuitry, and a battery power monitor. In one embodiment, the battery power monitor measures in real-time the battery charge level and makes a prediction of an estimated remaining battery charge level in response to the battery charge level.

In one variant, a local battery power adjustment mechanism generates in substantially real-time an updated set of network communication signaling protocols associated with at least one of a request rate of location coordinate packets to be communicated to a target host and a listen rate of the location coordinate packets. In yet another variant, the updated set of network communication signaling protocols has a value that is responsive to a user input request. In yet another embodiment, the local battery power adjustment mechanism activates or deactivates one or more portions of the transceiver circuitry to conserve the battery charge level. In yet another embodiment, the local battery power adjustment mechanism activates or deactivates the processor to conserve the battery charge level in response to the value having the value responsive to a user input request.

In a second aspect of the present invention, a local charging management device is disclosed to manage electrical resource capability for an electronic tracking device that is tracked by at least one other tracking device. In one embodiment, local charging management device includes a battery power monitor, a charging unit; and an electrical power resource management component. In one variant, the power resource management component adjusts cycle timing of a request rate of location coordinate packets communicated to a target host responsive to an estimate charge level of the charging unit. In another variant, the power resource management component adjusts a listen rate of location coordinate packets responsive to an estimated charge level of the charging unit. In yet another variant, the power resource management component adjusts one or more of request rate of location coordinate packets to a target host and a listen rate of location coordinate packets responsive to an estimated charge level of the charging unit.

In another aspect of the present invention, a method is disclosed to control power usage. In one embodiment, the method includes measurement of charging unit power level of a tracking device communicated by a location coordinate tracking system, and adjustment of charging unit power level of the tracking device in response to a substantially-real life estimate of the unit power level of a charge unit of the tracking device. In one variant, the method includes creation of an initial timing schedule for communication of signaling parameters associated with a request rate communicated with location coordinate information and listen rate communicated with the location coordinate information, the initial time schedule being at least partially automatically and responsive to an estimated power level of the charge unit. In yet another variant, the method includes readjustment of the initial timing schedule for communication of signaling parameters in accordance with a local request by a remote user using an Internet accessible icon that displays user viewable tradeoffs between the estimated charge unit life and charge unit update rate.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages and features of the invention are realized and attained by means of the instrumentalities, procedures, and combinations particularly pointed out in the appended claims.

DETAILED DESCRIPTION

Figure 1:
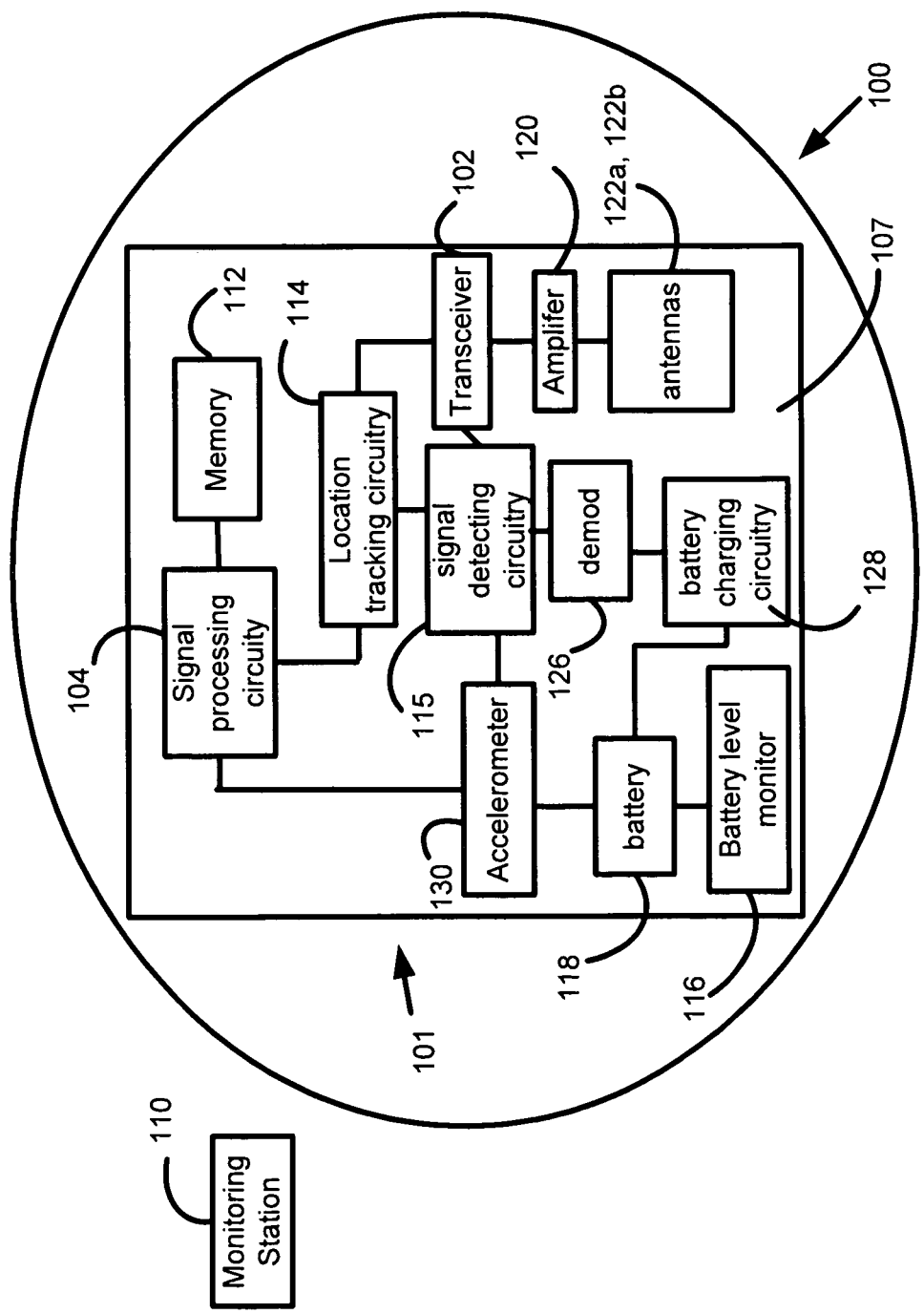
FIG. 1 illustrates a schematic of an electronic tracking device in accordance with an embodiment of the present invention.

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates.

As used herein, the terms "tracking device" and "electronic tracking device" refers to without limitation to any hybrid electronic circuit, integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and/or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

As used herein, the terms "data transfer", "tracking and location system", "location and tracking system", "location tracking system", and "positioning system," refer to without limitation to any system that transfers and/or determines location coordinates using one or more devices, such as Global Positioning System (GPS).

As used herein, the terms "Global Positioning System" refer to without limitation to any services, methods or devices that utilize GPS technology to determine position of a GPS receiver based on measuring a signal transfer time of signals communicated between satellites having known positions and the GPS receiver. A signal transfer time is proportional to a distance of a respective satellite from the GPS receiver. The distance between a satellite and a GPS receiver may be converted, utilizing signal propagation velocity, into a respective signal transfer time. The positional information of the GPS receiver is calculated based on distance calculations from at least four satellites to determine positional information of the GPS receiver.

As used herein, the terms "wireless network", "wireless communication", "wireless link", and "wireless transmission" refers to, without limitation, any digital, analog, microwave, and millimeter wave communication networks that transfer signals from one location to another location, such as, but not limited to IEEE 802.11 g, Bluetooth, WiMax, IS-95, GSM, IS-95, CGM, CDMA, wCDMA, PDC, UMTS, TDMA, and FDMA, or combinations thereof.

Major Features

In one aspect, the present invention discloses an apparatus and method to provide an improved capability electronic tracking device. In one embodiment, the device provides electronic circuitry including an accelerometer to measure location coordinates without requiring GPS signaling. In this embodiment, location coordinates of an electronic tracking device are measured when the electronic tracking device is located in a partially enclosed structure, e.g., a building or parking lot, up to a fully enclosed structure. In one embodiment, the electronic tracking device conserves battery power when the device is partially or fully blocked access to location coordinates from one or more GPS satellites, e.g., a primary location tracking system. In yet another embodiment, accelerometer measures force applied to the electronic tracking device and provides an alert message to a guardian or other responsible person. In one embodiment, the alert message includes location coordinates of the electronic tracking device and other information, e.g., magnitude or nature of force, as well as possibility of injury of an object or individual having the electronic tracking device. As described though out the following specification, the present invention generally provides a portable electronic device configuration for locating and tracking an individual or an object.

Exemplary Apparatus

Referring now to FIGS. 1-2 and 4-6 exemplary embodiments of the electronic tracking device of the invention are described in detail. Please note that the following discussions of electronics and components for an electronic tracking device to monitor and locate individuals are non-limiting; thus, the present invention may be useful in other electronic signal transferring and communication applications, such as electronics modules included in items such as: watches, calculators, clocks, computer keyboards, computer mice, and/or mobile phones to location and track trajectory of movement and current location of these items within boundaries of or proximity to a room, building, city, state, and country.

Furthermore, it will be appreciated that while described primarily in the context of tracking individuals or objects, at least portions of the apparatus and methods described herein may be used in other applications, such as, utilized, without limitation, for control systems that monitor components such as transducers, sensors, and electrical and/or optical components that are part of an assembly line process. Moreover, it will be recognized that the present invention may find utility beyond purely tracking and monitoring concerns. Myriad of other functions will be recognized by those of ordinary skill in the art given the present disclosure.

Electronic Tracking Device

Referring to FIG. 1, tracking device 100 contains various electronic components 101 such as transceiver 102, signal processing circuitry 104 (e.g., a microprocessor or other signal logic circuitry), and accelerometer 130. In one non-limiting example, the electronic components 101 are disposed, deposited, or mounted on a substrate 107 (e.g., Printed Circuit Board (PCB)). The PCB 107, for example, may be manufactured from: polyacrylic (PA), polycarbonate (PC), composite material, and arylonitrile-butadiene-styrene (ABS) substrates, blends or combinations thereof, or the like (as described in more detail in incorporated by reference U.S. patent application Ser. No. 11/933,024 filed on Oct. 31, 2007). The signal processing circuitry 104, in one example, associated with the tracking device 100 configured to store a first identification code, produce a second identification code, determine location coordinates, and generate a positioning signal that contains location data (as described in more detail in incorporated by reference U.S. patent application Ser. No. 11/753,979 filed on May 25, 2007). For instance, the location data includes longitudinal, latitudinal, and elevational position of a tracking device, current address or recent address of the tracking device, a nearby landmark to the tracking device, and the like. In one example, electronic tracking device 100 is portable, mobile and fits easily within a compact volume, such as standard shirt pocket having approximate dimensions of 1.5 inch by 2.5 inch by 1.0 inch. In yet another example, electronic tracking device 100 may be one integrated circuit having dimensionality in the mm range in all directions (or even smaller).

In one embodiment, location tracking circuitry 114, calculates location data received and sends the data to signal processing circuitry 104. Memory 112 stores operating software and data, for instance, communicated to and from signal processing circuit 104 and/or location tracking circuitry 114, e.g., GPS logic circuitry. In one embodiment, a signal detecting circuitry 115 detects and measures signal power level. In another embodiment, the signal processing circuitry 104 processes and measures signal power level. Battery level detection circuitry (e.g., battery level monitor 116) detects a battery level of battery 118, which contains one or more individual units or grouped as a single unit.

In one non-limiting example, antennas 122a, 122b electrically couple to transceiver 102. In one variant, transceiver 102 includes one integrated circuit or, in another embodiment, may be multiple individual circuits or integrated circuits. Transceiver 102 communicates a signal including location data between tracking device 100 and the monitoring station 110, for example, by any of the following including: wireless network, wireless data transfer station, wired telephone, and Internet channel. A demodulator circuit 126 extracts baseband signals, for instance at 100 KHz, including tracking device configuration and software updates, as well as converts a low-frequency AC signal to a DC voltage level. The DC voltage level, in one example, is supplied to battery charging circuitry 128 to recharge a battery level of the battery 118. In one embodiment, a user of monitoring station 110, e.g., a mobile personal digital assistant, mobile phone, or the like, by listening (or downloading) one or more advertisements to reduce and/or shift usage charges to another user, account, or database (as described in more detail in previous incorporated by reference U.S. patent application Ser. No. 11/784,400 and Ser. No. 11/784,318 each filed on Apr. 5, 2007).

In another embodiment, an accelerometer 130, for example, a dual-axis accelerometer 130, e.g. ADXL320 integrated circuit manufactured by Analog Devices having two substantially orthogonal beams, may be utilized. The data sheet ADXH320L from Analog Devices is incorporated by reference. In one embodiment, the accelerometer 130 activates upon one or more designated antenna(s), e.g., antennas 122a, 122b, detecting a first signal level, e.g., a low signal level or threshold value, as specified by, for instance, a user or system administrator. In one variant of this embodiment, electrical circuitry associated with GPS signal acquisition, e.g., all or a portion of amplifier block 120, may be, for instance, placed on standby or in a sleep mode. In another embodiment, the accelerometer 130 remains in a standby mode until, for instance, a system administrator, a specified time period, or a user activates the accelerometer 130. In one embodiment, the amplifier block 120 includes multiple electronic functions and blocks including a low noise amplifier, a power amplifier, a RF power switch, or the like, placed in a sleep or standby mode, for instance, to converse a battery level of the battery 118.

In another variant of this embodiment, circuitry, such as amplifier block 120 or location tracking circuitry 114, may be placed in a sleep or standby mode to conserve a battery level of the battery 118. In one variant, the tracking device 100 periodically checks availability of GPS signal, e.g., performs a GPS signal acquisition to determine if a receive communication signal is above a first signal level. Referring to embodiment depicted in FIG. 2, electronic tracking device 100 exits an opening 150 in partially enclosed structure 210; thus, electronic tracking device 100 may resume GPS signal acquisition using GPS satellite 143 (e.g., in response to a periodic check by the tracking device 100 of a receive communication signal level above a first signal level).

In one embodiment, system administrator selects a signal noise bandwidth, e.g., within a range of 3 to 500 Hz, of the accelerator 130 to measure dynamic acceleration (e.g., due to vibration forces applied to electronic tracking device 100). In another embodiment, system administrator selects a signal noise bandwidth, e.g., within a range of 3 to 500 Hz, to measure static acceleration (due to gravitational forces applied to electronic tracking device 100). In particular, external forces on electronic tracking device 100 cause, for example, internal structural movements, e.g., deflection of dual-axis beams, of the accelerometer 130. The deflection of dual-axis beams generates differential voltage(s).

Differential voltage(s) are proportional to acceleration measurements, e.g., discrete acceleration measurements, of electronic tracking device 100, for instance in x, y, and z directions. Differential voltage(s), in one instance, are relative to, for instance, a last known GPS location coordinates of electronic tracking device 100. By performing electronic device proximity measurements, e.g., measuring acceleration vectors of electronic tracking device 100 at time intervals, e.g., T1, T2, T3 . . . TN, monitoring station 110 computes electronic tracking device velocity at time intervals, e.g., T1, T2, T3 . . . TN. In one embodiment, time intervals, e.g., T1, T2, and T3 . . . TN are measured in accordance with instructions by a system administrator or user. In one embodiment, time intervals are selected within a range of one micro-second to several minutes.

In one embodiment, the monitoring station 110 performs an integration of the acceleration measurements as a function of time to compute electronic tracking device velocity at time intervals, e.g., T1, T2, and T3 . . . TN. By referencing prior location coordinates, e.g., last known accurate location data of the electronic tracking device 100 or last known location data of nearby electronic tracking device (e.g., second tracking device 101 in proximity to electronic tracking device 100), monitoring station 110 computes a current location of electronic tracking device 100 utilizing electronic tracking device velocity computations. Advantageously, monitoring station 110, in an above described embodiment, uses above described device proximity measurements to monitor current location data of electronic tracking device 100 without connectivity to receive communication signals from GPS satellites.

Figure 2:
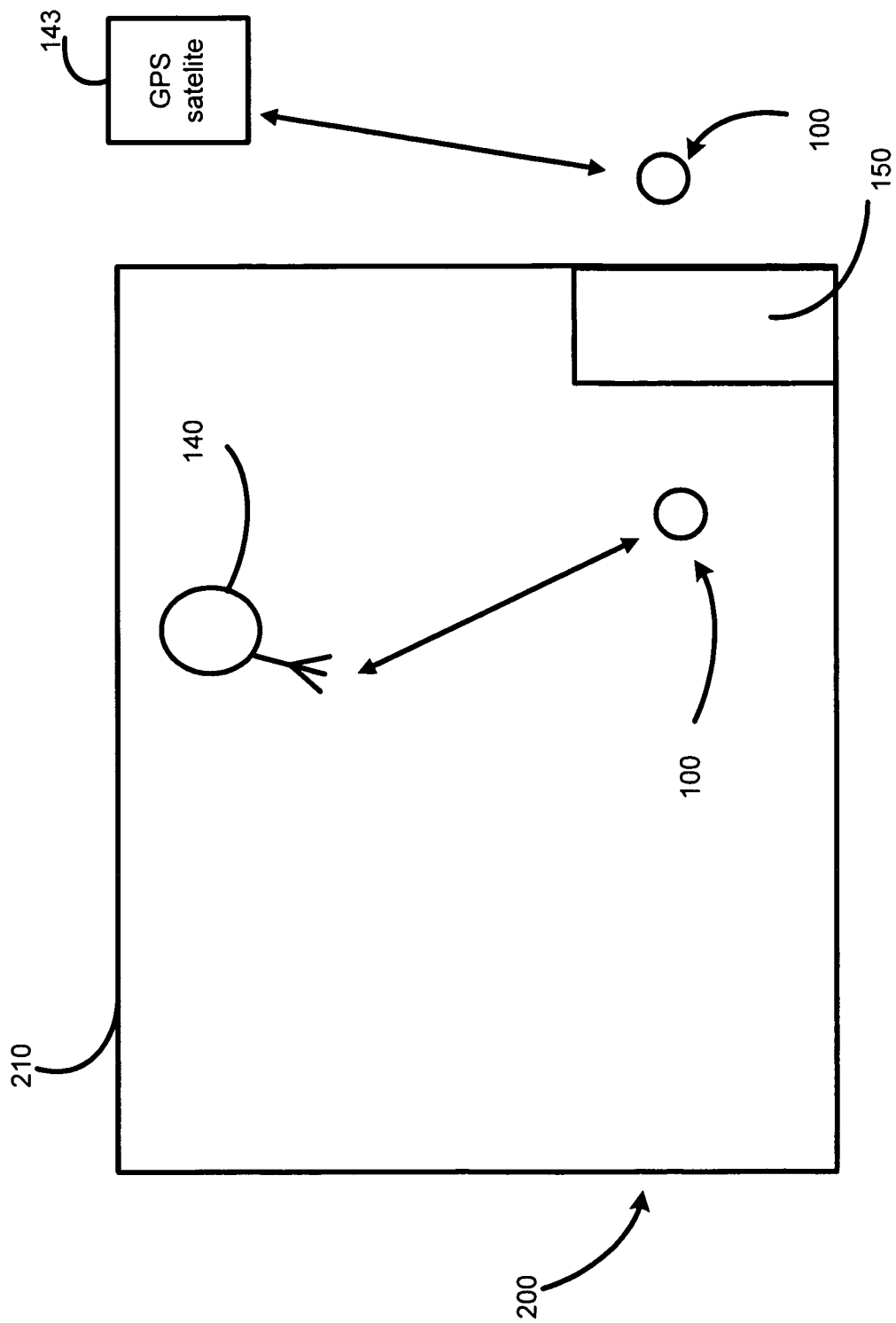
FIG. 2 illustrates a location tracking system associated with the electronic tracking device and the wireless network in accordance with an embodiment of the present invention.

In one embodiment, the monitoring station 110 may include a mobile phone having connectivity to wireless network 140 electrically coupled to electronic tracking device 100 (FIG. 2). In this variant, the wireless network 140 resides or circulates within at least a portion of a semi-enclosed, partially-enclosed, or fully enclosed structure, e.g., building, parking structure, closet, storage room, or the like (e.g., structure 210 in FIG. 2). Furthermore, in one embodiment, the present invention conserves battery power by placing on standby, low power mode, or disabling entirely GPS signal acquisition circuitry and other associated devices, e.g., all or a portion of amplifier block 120 including power amplifiers, LNAs, switches, and the like. Furthermore, during supplemental location coordinates tracking, e.g., electronic device proximity measurements, the transceiver circuitry (e.g., transceiver 102, location tracking circuitry 114, and signal processing circuitry 104) consumes reduced battery power for GPS circuitry while the electronic tracking device 100 communicates displacement vectors (e.g., differential location coordinates) to monitoring station 110 (e.g., a mobile phone, a personal digital assistant) through a wireless network 140. As described above, when GPS signaling is not practicable, electronic device proximity measurements provide differential location coordinate information to calculate current location coordinate information.

In one embodiment, accelerometer, e.g., accelerometer 130, determines if electronic tracking device 100 in a stationary position for a period, for instance, designated by system administrator or user. For example, electronic tracking device 100 may be, for example, located on a counter top, within a pocket of clothing, or inside a suitcase, not being moved, or not currently in use. Continuing with this embodiment, electronic tracking device 100 communicates a code, e.g., a stationary acknowledgement code, to communication network, e.g., wireless network 140. In one variant, when or if monitoring station 110 requests location data through communication network, electronic tracking device 100 determines located in a stationary or substantially stationary position and electronic tracking device 100 communicates its last-known location to the monitoring station 110 without accessing or requiring GPS signaling or active GPS circuitry, e.g., location tracking circuitry 114. Advantageously, in this embodiment, when electronic tracking device 100 does not utilize and require GPS circuitry, e.g., location tracking circuitry 114, or functionality, the power resources are preserved of battery 118 in contrast to many conventional GPS communication system continuing power-on GPS circuitry. In one embodiment, electronic tracking device 130 associated with a person or object remains at a substantially stationary position approximately one-forth to one-third of a calendar day; thus, this feature of not accessing GPS circuitry preserves battery power.

In another embodiment, an accelerometer, such as accelerometer 130, detects tapping against electronic tracking device 100. For instance, upon wake-up, user prompt, system administrator prompt, or active, accelerometer 130 detects a person or object tapping a sequence on electronic tracking device 100. In one embodiment, electronic tracking device 100 includes digital signal programming circuitry (such as of signal processing circuitry 104). The digital signal programming circuitry recognizes programmed motions received by accelerometer, such as accelerometer 130, and transmits an alert message to the monitoring station 110 upon receiving a recognized motion pattern. For example, electronic tracking device 100 may be programmed to recognize an "SOS tap cadence". Thus, if electronic tracking device 100 is repeatedly tapped, for instance, in a "dot-dot-dot, dash-dash-dash, dot-dot-dot" pattern, signal processing circuitry 104 recognizes a motion pattern and transmit an alert message to wireless network 114 to monitoring station 110. In one instance, alert message may be associated as a distress pattern and will require an appropriate response. In one variant, the accelerometer may recognize when an object or individual spins or turns motion of electronic tracking device 100. Continuing with this embodiment, signal processing circuitry 104 recognizes programmed motions, and transceiver 102 transmits an alert message to wireless network 114 associated with programmed motions. In another variant, electronic tracking device 100 is programmed to recognize other motion patterns, such as, when it is tumbled or flipped. Depending upon on duration, time, or cadence of these movements or motion patterns, electronic tracking device 100 communicates an alert message to the wireless network 114. In one variant, wireless network 114 performs an appropriate action, such as communicating information signal to monitoring station 110.

In another example, physical impacts on electronic tracking device 100 are measured to determine if an individual or object may be injured. In one embodiment, magnitude of displacement vectors may be measured by one or more accelerometers, such as accelerometer 130, disposed at various inclinations and orientations, e.g., disposed substantially orthogonal to one another. Continuing with this embodiment, when a measured physical impact is above a predetermined level, an object or individual associated with electronic tracking device 100 may have suffered a fall or be in need of medical attention. In one variant of this embodiment, a user (e.g., a system administrator, or person located in a contact book) at monitoring station 110 becomes alerted, e.g., by text message, email, or voice mail (as more fully described in previously incorporated by reference U.S. patent application Ser. No. 11/935,901 filed on Nov. 6, 2007, entitled "System and Method for Creating and Managing a Personalized Web Interface for Monitoring Location Information on Individuals and Objects Using Tracking Devices"). In one variant of this embodiment, if a user does not affirmatively respond, another individual, guardian, medical personnel, or law enforcement officer is contacted by monitoring station 110 (as more fully described in Ser. No. 11/935,901). In yet another variant of this embodiment, monitoring station 110 continues to contact individuals until the alert message is affirmatively answered.

Battery Conservation

Figure 3:
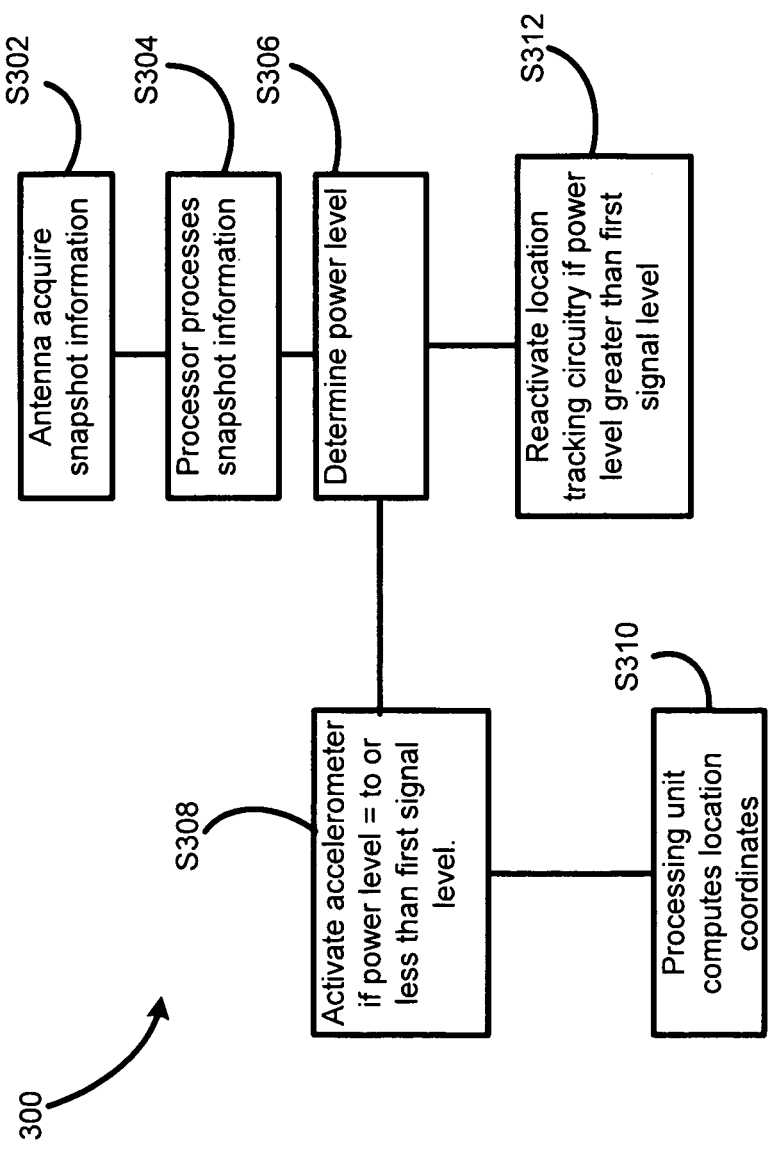
FIG. 3 illustrates a flow diagram to manage and control circuitry associated with the electronic tracking device of FIGS. 1 and 2 in accordance with an embodiment of the present invention.

Referring to FIG. 3, a flow chart 300 illustrates battery conservation for electronic tracking device 100 as described in FIGS. 1, 2 in accordance with one embodiment of the present invention. In step 302, antenna 122a associated with electronic tracking device 100 acquires a snapshot of receive communication signal including location coordinates data. In step 304, processing unit 104 processes the snapshot of receive communication signal including location coordinates data. In step 306, processing unit 104 determines a power level of receive communication signal. In step 308, accelerometer 130 activates if a power level of the receive communication signal is insufficient for processing. In one variant of step 308, accelerometer 130 measures acceleration of electronic tracking device 100 at time intervals, e.g., T1, T2, T3 . . . TN.

In step 310, processing unit 104 computes current location coordinates using acceleration measurements. In step 312, all or a portion of amplifier block 120 and associated circuitry, e.g., location tracking circuitry, are activated at selected time intervals to determine if receive communication signal is of sufficient signal strength. In one variation of step 312, upon determining receive communication signal of sufficient signal strength, location tracking circuitry 114 are activated, and processing unit 104 determines location coordinates from the receive communication signal. In another variation of step 312, upon determining receive communication signal of sufficient signal strength, accelerometer 130 is deactivated and location tracking circuitry 114 are activated, and processing unit 104 determines location coordinates from the receive communication signal.

User Adjustable Location Coordinate Refresh Rate

Figure 4:
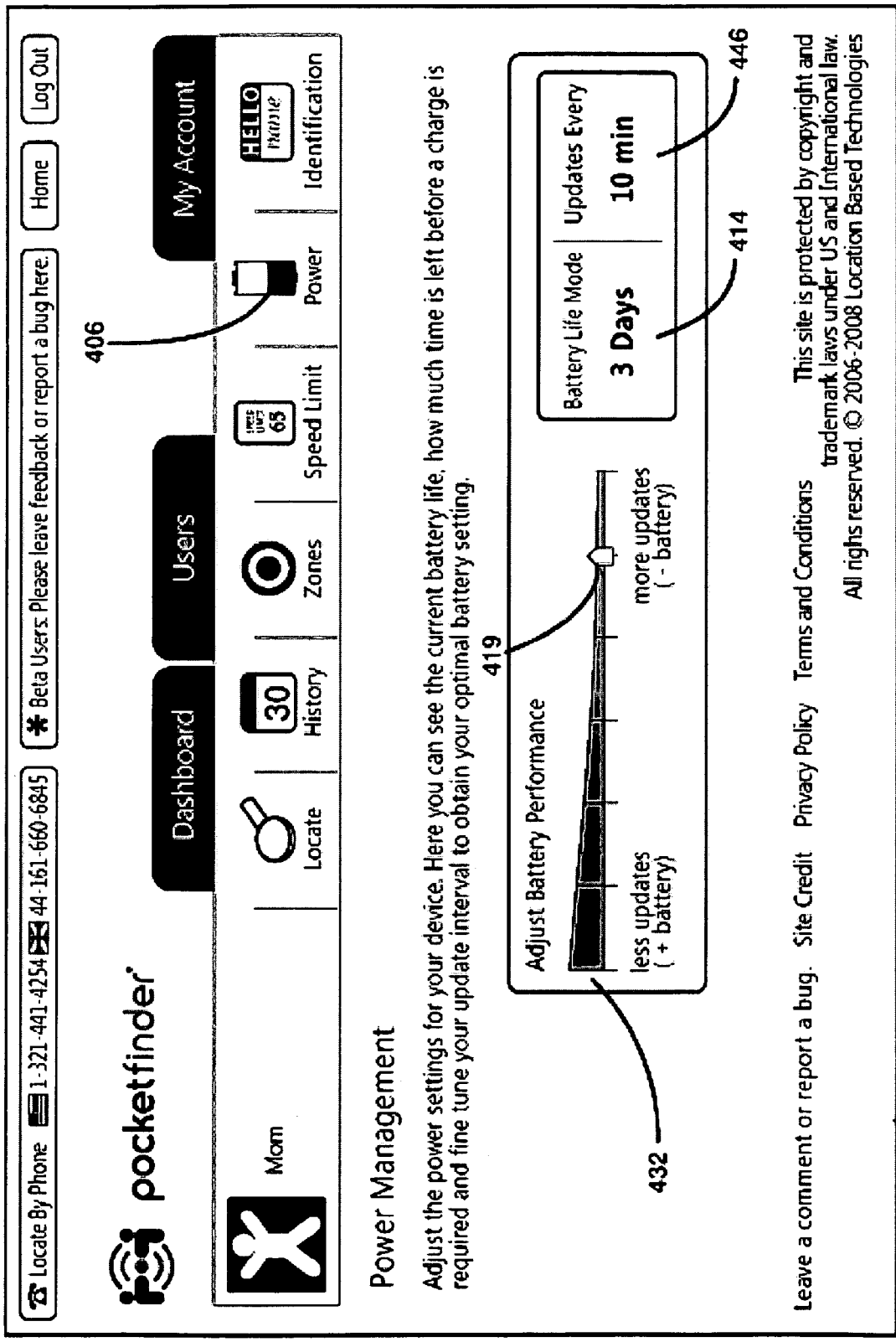
FIG. 4 illustrates a screen display including a user definable adjustable power level monitor in accordance with an embodiment of the present invention.
Figure 5:
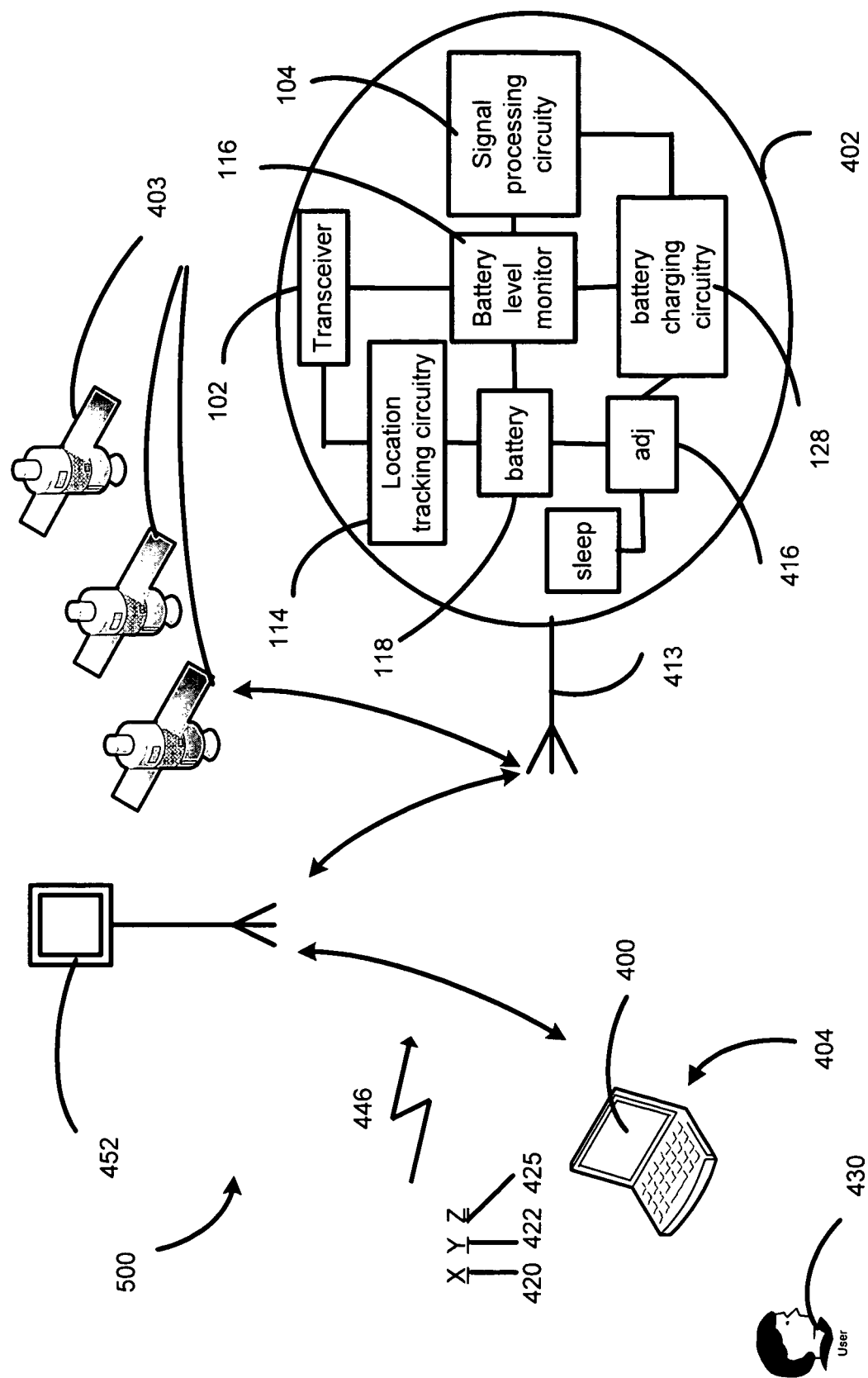
FIG. 5 illustrates a location coordinate navigational system utilizing user definable power level monitor of FIG. 4 in accordance with an embodiment of the present invention.

Referring to FIG. 4, screen display 400 illustrates a user definable adjustable location coordinate refresh rate in one embodiment of the present invention. As best illustrated in FIG. 5, schematic 500 illustrates communication of location coordinate refresh rate between portable electronic tracking device 402 and satellite navigation system 403 in accordance with an embodiment of the present invention.

In one embodiment, portable electronic tracking device 402 monitors location coordinates of one or more individuals and objects using satellite navigation system 403. Portable electronic tracking device 402 includes battery 118 having battery charge level 406 displayed on screen display 400 of personal communication device 404 (e.g., mobile phone, wireless digital assistant, laptop computer, personal computer and the like). Other components of portable electronic tracking device 402 include transceiver 102, signal processing circuitry 104, battery level monitor 116, signal processing circuitry 104, location tracking circuitry 114, adj 416, and battery charging circuitry 128.

In one example, battery level monitor 116 measures in real-time battery charge level 406. In one embodiment, battery level monitor 116 predicts, for instance, estimated remaining battery charge life 414 in response to battery charge level 406. This estimation or prediction may be based on standard techniques know by those skilled in the art at the time of this disclosure including measurement of time average amperage draw and voltage level (over a given period) to estimate remaining battery charge life 414.

In one embodiment, local battery power adjustment mechanism 416 generates in substantially real-time updated set of network communication signaling protocols. In one variant, updated set of network communication signaling protocols communicated, for instance, includes an update rate (e.g., refresh rate) of location coordinate packets 446. In one example, update rate of location coordinate packets 446 includes request rate 420 of location coordinate packets 422 by target host 452 (e.g., a computer server) and/or listen rate 425 of location coordinate packets 422 by portable electronic tracking device 402. Updated set of network communication signaling protocols, for instance, has value (e.g., X Y Z) responsive to user input request 430.

In one embodiment, to conserve battery power when communicating messages between target host 452 and portable electronic tracking device 402, local battery power adjustment mechanism 416, for instance, remotely by personal communication device 404 communicates a message to active or deactivate a portion of transceiver circuitry 102 or processor circuitry 104 or location tracking circuitry 114 to conserve battery charge level 406 responsive to value 419 (e.g., a user input screen control or mouse adjustable cursor value). In one variant, local battery adjustment mechanism 416 includes user adjustable screen icon 432 to graphically display in substantially real-time trade-off relationships between remaining battery charge level 414 and update rate 446 (e.g., refresh rate) of location coordinate packets 422. Advantageously as compared to conventional tracking devices, user input request 430 adjusts value 419 to select an appropriate update set of network communication signaling protocols to achieve a desired user defined battery operating environment, e.g., obtain optimal battery life, obtain optimal update rate, tradeoffs between them. In one embodiment, when user adjusts slider 432 to value 419, a message is sent to target host 452, which communicates an updated set of network communication to portable location tracking device 402.

Figure 6:
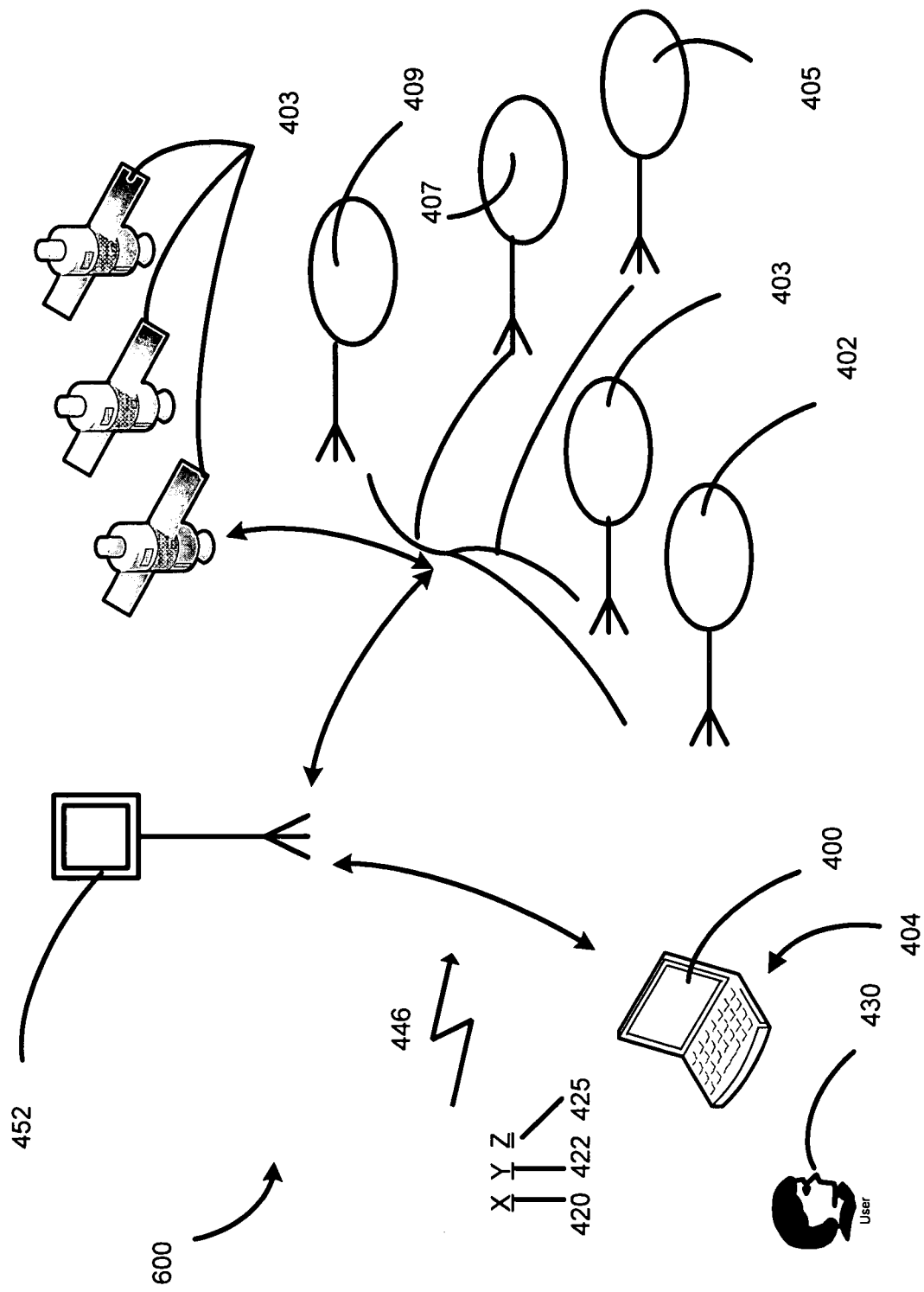
FIG. 6 illustrates a location coordinate navigation system utilizing a user definable power level monitor of FIG. 4 in accordance with an embodiment of the present invention.

In response to receipt of updated set of network communication signaling protocols, portable location tracking device 402 adjusts settings (an internal time schedule) and acknowledges receipt of the message to target host 452. Portable location tracking device 402 checks internal time schedule to determine if it should listen for (perform a location lookup of) location coordinates 422 from satellite navigation system 403 or an adjacent portable location coordinate tracking device (as shown in FIG. 6) as more fully described in, for instance, U.S. patent application Ser. No. 11/753,979 filed on May 25, 2007, which has been previously incorporated by referenced and claimed priority to. Portable location tracking device 402 obtains location coordinates 422 and stores, for instance, in one or more internal breadcrumb memory location(s). Based on the internal time schedule, portable location tracking device 402 determines whether to transmit contents of the one or more breadcrumb memory location(s) to target host 452.

Upon transmission of contents, target host 452 acknowledges receipt of contents of one or more breadcrumb memory locations. In one variant, target host 452 issues a command to flush one or more breadcrumb memory locations. In this same variant, portable electronic tracking device 402 flushes its internal breadcrumb memory and acknowledges completion of the command to the target host 452. In another variant, target host 452 issues a stack pointer adjustment command to acknowledge receipt of previously submitted contents of breadcrumb memory locations and to move stack pointer to an adjacent or an alternative breadcrumb memory location to signal that these memory location have been uploaded by target host 452.

In another embodiment, local battery adjustment mechanism 416 includes timing adjustment mechanism 446 adjusting, for instance, request rate 420 of location coordinate packets 422 to target host 452 and listen rate 425 of location coordinates 422 in accordance with a current location coordinate position of portable tracking device 402. In one variant, local battery adjustment mechanism 416 includes user adjustable electronic display 432 that indicates current level of battery 406 and allows user a capability to adjust power level thereof. In one variant of this embodiment, local battery adjustment mechanism 416 includes automatic or semi-automatic sleep mode 448. In one embodiment, automatic or semi-automatic sleep mode 448 sets to a minimal level request rate 420 of location coordinate packets 422 to target host 452 and listen rate 425 of location coordinates 422 until battery power monitor 116 measures, for instance, a sustainable battery charge level to sustain operation of portable electronic tracking device 402.

In one embodiment, local battery adjustment mechanism 416 includes charge control management (e.g., adj 416) of portable electronic tracking device 402 that estimates charge capability (e.g., battery charge remaining 414) and adjusts cycling of one or more of request rate 420 of location coordinate packets 422 to target host 452 and listen rate 425 of location coordinate packets 422 to maximize charge capability. In one alternative embodiment, local battery adjustment mechanism (e.g., adj 416) includes cycle management apparatus 416 to set up, for example, timing schedule (e.g., refresh rate 446) to maximize effectiveness of request rate 420 and listen rate 425 in response to substantially real-time measured velocity of travel of portable electronic tracking device 402.

Referring to FIGS. 5 and 6, system 500 and system 600 respectively include local charging management device (e.g. local battery adjustment mechanism 416) manages electrical resource capability for an electronic tracking device 402 that is tracked by at least one other tracking device (e.g., devices 403, 405, 407, 409). In one embodiment, tracking device (e.g., portable electronic tracking device 402) includes a battery level monitor 116 remotely located for charging unit (e.g., battery charging circuitry 128), adj 416 (e.g., electrical power resource management component, local battery adjustment mechanism 416). In one variant, electrical power resource management component adjusts cycle timing of request rate 420 of location coordinate packets 422 to target host 452 and listen rate 425 of location coordinate packets 422 from satellite navigation system 403 responsive to estimated charge level of charging unit (e.g., battery charge level 406).

In one embodiment, electrical power resource management component (e.g., local battery adjustment mechanism 416) includes a substantially real-time user viewable display icon 432 that indicates estimate charge level (e.g., battery level 406) and provides an on-line user adjustable cursor display 432 (see FIG. 4). In one example, on-line cursor display 432 adjusts one or more of: request rate 420 of location coordinate packets 422 to target host 452 and listen rate 425 and gives substantially automatic updated estimated charge level of the charging unit (e.g., battery charging circuitry or unit 128). In one variant, local battery management device 416 includes charge control management of electronic tracking device 402 that estimates charge capability and adjust cycling of request rate 420 of location coordinate packets 422 to host target 428 and listen rate 425 of location coordinate packets 422 from satellite navigation system 403 or alternatively an adjacent portable location tracking device to maximize charge capability.

In yet another embodiment, local charging management device 416 includes cycle management apparatus to set up timing schedule 446 to maximize effectiveness of request rate 420 and listen rate 425 in response to measured velocity of travel portable electronic tracking device 402. In one variant, local charging management device 416 electrically coupled through personal communication device 404 sets up timing schedule 446 between one or more than one wireless communication networks to communicate information between portable electronic tracking device 402. In one example of this embodiment, listen rate 425 of location coordinate packets 422 to the host target 428 and response rate 425 includes global positioning system (GPS) system refresh rate 446.

Advantageously as compared to prior global positioning systems having manufactured defined power settings, the current invention power charging monitor (e.g., battery level monitor 116) measures a power level (e.g., battery power level 406) of the power charging unit (e.g., battery level monitor 116) and substantially automatically adjusts power usage responsive to available power of power charging unit to maximize power life.

In yet another advantage, the present invention power charging monitor (e.g., battery level monitor 116) measures a power level (e.g., battery power level 406) of power charging unit (e.g., battery 118) and adjusts a power level (e.g., battery power level 406) applied to, for example, location tracking circuitry (e.g., location tracking circuitry 114) or transceiver 102 responsive to one or more signal levels. In contrast to previous manufacturer tracking device power level settings, the present invention has the capability of power level (e.g., battery power level 406) adjustments include multitude of threshold values (see active display 432 of FIG. 4) that is determined by user or system administrator to intermittently activate or deactivate location tracking circuitry (e.g., location tracking circuitry 114) to conserve power of the power charging unit (e.g., battery 118) responsive to estimated charge level (e.g., battery charge level 406).

In a first example, a lost dog has portable location tracking device 402. Using the present invention, a user, e.g., a dog owner, will adjust a slider level, such as using on-line cursor display 432, to a high update rate interval. For instance, the high setting corresponds to 15 minute intervals for location and 15 minute intervals for transmission to target host, e.g., server. The server sends these settings to portable location tracking device 402 and portable location tracking device 402 adjusts its settings and acknowledges the message. As such, portable location tracking device 402 will perform frequent updates of its location coordinates from a satellite navigation system and will transmit frequently its location coordinates to a target host. Thus, advantageously, with this setting, a user will probably more rapidly locate a missing or lost pet. With this setting, battery life will be relatively short.

In a second example, a teenager borrows a parent's car having portable location tracking device 402. Using the present invention, users, e.g., parents, desire to know if their teenager is driving safely in designated areas or locations, but does not want to track the teenager's location in real-time. In this case, the parents adjust a slider level, such as using on-line cursor display 432, to a medium update rate interval. For instance, the medium setting corresponds to 15 minute intervals for location and 60 minute intervals for transmission to the target host, e.g., server. The server sends these settings to portable location tracking device 402 and portable location tracking device 402 adjusts its settings and acknowledges the message. As such, portable location tracking device 402 will perform frequent updates of its velocity and location coordinates from a satellite navigation system and will less frequently transmit its location coordinates to a target host. As long as the teenager remains in allowed areas and traveling at allowed speeds, the portable location tracking device will not transmit frequently. Fortunately, during these infrequent transmissions, portable location tracking device will transmit its location history. Thus, advantageously, with this setting, parents can see history at many locations while still preserving battery life, e.g., longer life than first example.

In a third example, a provider of construction equipment having portable tracking device 402 rents the equipment to contractors. Using the present invention, a user, e.g., provider desires to know location of the equipment once per day. In this case, the provider adjusts a slider level, such as using on-line cursor display 432, to a low update rate interval. For instance, the low setting corresponds to 1440 minute intervals (24 hours) for location coordinates and 1440 minute intervals (24 hours) for transmission to the target host, e.g., server. The server sends these settings to portable location tracking device 402 and portable location tracking device 402 adjusts its settings and acknowledges the message. As such, portable location tracking device 402 will perform infrequent updates (once per day) of location coordinates from a satellite navigation system and will less frequently transmission (once per day) of its location coordinates to a target host. Thus, advantageously, with this setting, portable location coordinate device will realize increased battery life, e.g., longer life than first and second examples.

User Adjustable Power Level Monitor Flow Chart

Figure 7:
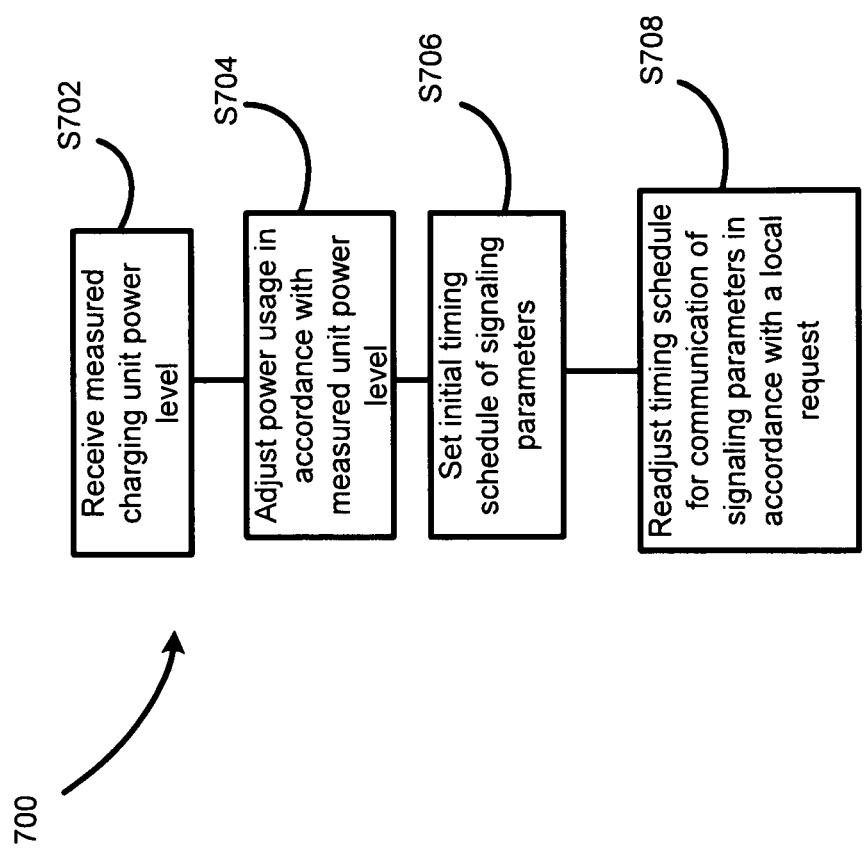
FIG. 7 illustrates a flow diagram of a user definable adjustable power level monitor in accordance with an embodiment of the present invention.

Referring to FIG. 7, flow chart 700 illustrates user definable adjustable conservation power level monitor for portable electronic tracking device 402 as described in FIGS. 4, 5, and 6 in accordance with one embodiment of the present invention.

In step 702, user receives measured charging unit power level of tracking device 402 communicated by a location coordinate tracking system 403. In step 704, system administrator, user, automatic or semi-automatic program software adjusts charging unit power level of tracking device 402 in response to a substantially-real life estimate of the unit power level 406 of a charge unit 118 of tracking device 402.

In step 706, system administrator, user, automatic or semi-automatic power monitoring software program creates an initial timing schedule 446 including communication of signaling parameters associated with a request rate 420 communicated with location coordinate information 422 and listen rate 425 of location coordinate information 422. In one variant of step 706, initial timing schedule 446 was at least partially automatically and responsive to an estimated power level 414 of the charge unit 118.

In step 708, user readjusts the initial timing schedule 446 for communication of signaling parameters in accordance with a local request by remote user using an Internet accessible icon 432 that displays user viewable tradeoffs between the estimated charge unit life and charge unit update rate. In one variant of step 708, remote user uses a mouse to enter an on screen cursor value 419 that is associated with a tradeoff of estimated charge life 414 and an update rate 446 of location coordinate information 422.

It is noted that many variations of the methods described above may be utilized consistently with the present invention. Specifically, certain steps are optional and may be performed or deleted as desired. Similarly, other steps (such as additional data sampling, processing, filtration, calibration, or mathematical analysis for example) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A portable electronic tracking device to monitor location coordinates of one or more individuals and objects using a satellite navigation system, the portable electronic tracking device comprising:
   a battery having a battery charge level;
   transceiver circuitry;
   processor circuitry;
   a battery power monitor to measure in real-time the battery charge level and to make a prediction of an estimated remaining battery charge level in response to the battery charge level;
   local battery power adjustment mechanism to generate in substantially real-time an updated set of network communication signaling protocols associated with at least one of a request rate of location coordinate packets to be communicated to a target host and a listen rate of the location coordinate packets from a satellite navigation system, the updated set of network communication signaling protocols having a value that is responsive to a user input request;
   wherein the local battery power adjustment mechanism actives or deactivates at least one portion of the transceiver circuitry or the processor circuitry to conserve the battery charge level in response to the value.

2. The device of claim 1, wherein the local battery power adjustment mechanism comprises an adjustable screen icon to graphically display in substantially real-time a trade-off relationship between the remaining battery charge level and an update rate of the location coordinate packets that is in response to the updated set of network communication signaling protocols.

3. The device of claim 1, wherein the local battery power adjustment mechanism comprises a timing adjustment mechanism that adjusts the at least one of the request rate of the location coordinate packets to the target host and the listen rate of the location coordinates from a satellite navigation system in accordance with a current position of the tracking device.

4. The device of claim 1, wherein the local battery power adjustment mechanism comprises a user adjustable electronic display that indicates a current level of battery power and allows a user a capability to adjust power level thereof.

5. The device of claim 4, wherein the local battery power adjustment mechanism comprises an automatic sleep mode to set at least one of the request rate of the location coordinate packets to the target host and the listen rate of the location coordinates from the satellite navigation system to a minimal level until the battery power monitor measures a sustainable battery charge level to process the at least one portion of an receive signal.

6. The device of claim 4, wherein the local battery power adjustment mechanism comprises a charge control management of the portable electronic tracking device that estimates charge capability and adjusts cycling of the at least one of a request rate of location coordinate packets to a target host and a listen rate of the location coordinate packets from the satellite navigation system to maximize charge capability.

7. The device of claim 1, wherein the local battery power adjustment mechanism comprises a cycle management apparatus to set up a timing schedule to maximize effectiveness of the request rate and the listen rate in response to a substantially real-time measured velocity of the portable electronic tracking device.

8. A local charging management device to manage electrical resource capability for an electronic tracking device that is tracked by at least one other tracking device comprising:
   a battery power level monitor;
   a charging unit; and
   an electrical power resource management component to adjust cycle timing of at least one of a request rate of location coordinate packets to a target host and a listen rate of the location coordinate packets responsive to an estimated charge level of the charging unit,
   wherein the battery power level monitor measures a power level of the charging unit and adjusts a power level applied to location tracking circuitry responsive to one or more signal levels, the power level comprising a multitude of threshold values determined by a user or system administrator to intermittently activate or deactivate the location tracking circuitry to conserve power of the charging unit in response to the estimated charge level of the charging unit.

9. The apparatus of claim 8, wherein the electrical power resource management component comprises a substantially real-time user viewable display icon that indicates the estimated charge level and provides an on-line user adjustable cursor display that adjusts at least one of the request rate of the location coordinate packets to the target host and the listen rate of the location coordinate packets and gives substantially automatic updated estimated charge level of the charging unit.

10. The apparatus of claim 8, wherein the local charging management device comprises a charge control management of the portable electronic tracking device that estimates charge capability and adjusts cycling of the at least one of a request rate of location coordinate packets to a host target and a listen rate of the location coordinate packets to maximize charge capability.

11. The apparatus of claim 8, wherein the local charging management device comprises a cycle management apparatus to set up a timing schedule to maximize effectiveness of the request rate and listen rate responsive to measured velocity of the portable electronic tracking device.

12. The apparatus of claim 11, wherein the local charging management device electrically couples to a mobile phone to remote control the local apparatus to setup a timing schedule from a multitude of wireless communication networks to communicate information between the electronic tracking device and the mobile phone.

13. The apparatus of claim 8, wherein the listen rate of the location coordinates comprises a global positioning system (GPS) system refresh rate of the location coordinates.

14. The apparatus of claim 8, wherein the request rate and the listen rate are set remotely by a user using a mobile phone or wireless communication device.

15. The apparatus of claim 8, wherein the battery power level monitor measures a power level of the charging unit and substantially automatically adjusts power usage responsive to available power of the charging unit to maximize power unit life.

16. A method to control power usage comprising:
measuring charging unit power level of a tracking device communicated by a location coordinate tracking system;
adjusting charging unit power level of the tracking device in response to a substantially-real life estimate of a unit power level of a charge unit of the tracking device;
creating an initial timing schedule for communication of signaling parameters associated with a target host request rate communicated with location coordinate information and listen rate of the location coordinate information, the initial time schedule being at least partially automatically and responsive to an estimated power level of the charge unit; and
readjusting the initial timing schedule for communication of signaling parameters in accordance with a local request by a remote user using an Internet accessible icon that displays user viewable tradeoffs between an estimated charge unit life and a charge unit update rate.

17. The method of claim 16, wherein creating an initial timing schedule for communication of signaling parameters comprises creating a management schedule for setting a rate at which messages are exchanged between the tracking device and a target host.

18. The method of claim 16, wherein creating an initial timing schedule for communication of signaling parameters comprises creating a management schedule for setting a rate at which messages are exchanged between a navigational satellite system and the tracking device to a local device to maximize effectiveness of the request rate and the listen rate to the location coordinate information in response to a measured velocity of the tracking device.

19. The method of claim 16, wherein readjusting the timing schedule for communication of signaling parameters in accordance with a local request by a remote user comprise electrically coupling the tracking device to a mobile phone to remote control cycling the location coordinates to setup up a timing schedule between a multitude of wireless communication networks to communicate information between the electronic tracking device and the mobile phone.

* * * * *